June 15, 1926.
M. D. DOMINGUEZ
1,588,711
ELECTROMAGNETICALLY OPERATED MOTOR
Filed May 13, 1925    3 Sheets-Sheet 1
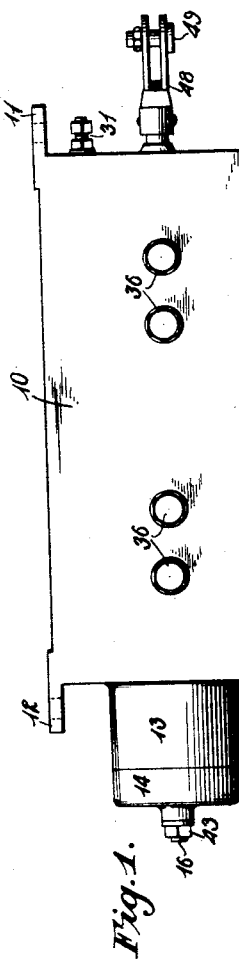
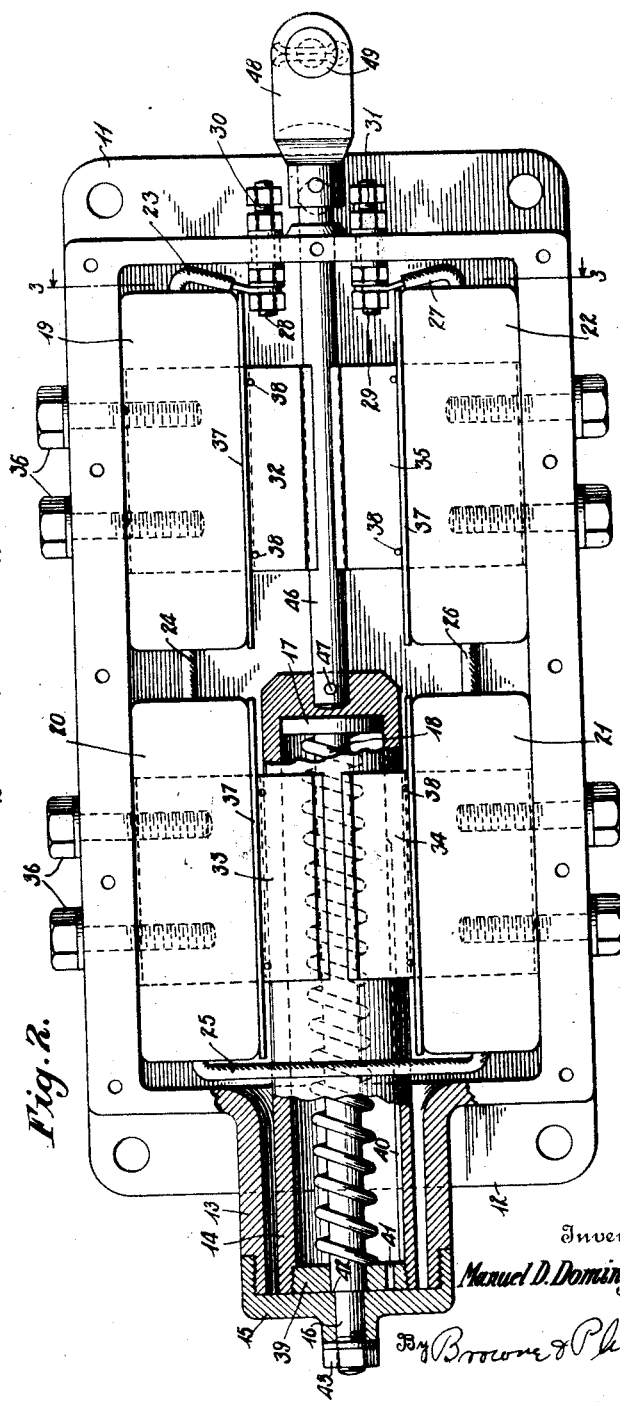
Inventor
Manuel D. Dominguez
By Browne & Phelps
Attorneys

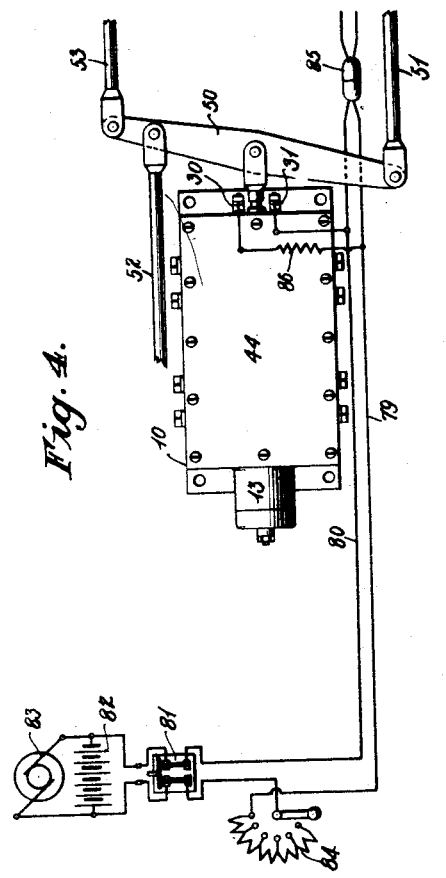

June 15, 1926.
M. D. DOMINGUEZ
1,588,711
ELECTROMAGNETICALLY OPERATED MOTOR
Filed May 13, 1925    3 Sheets-Sheet 3
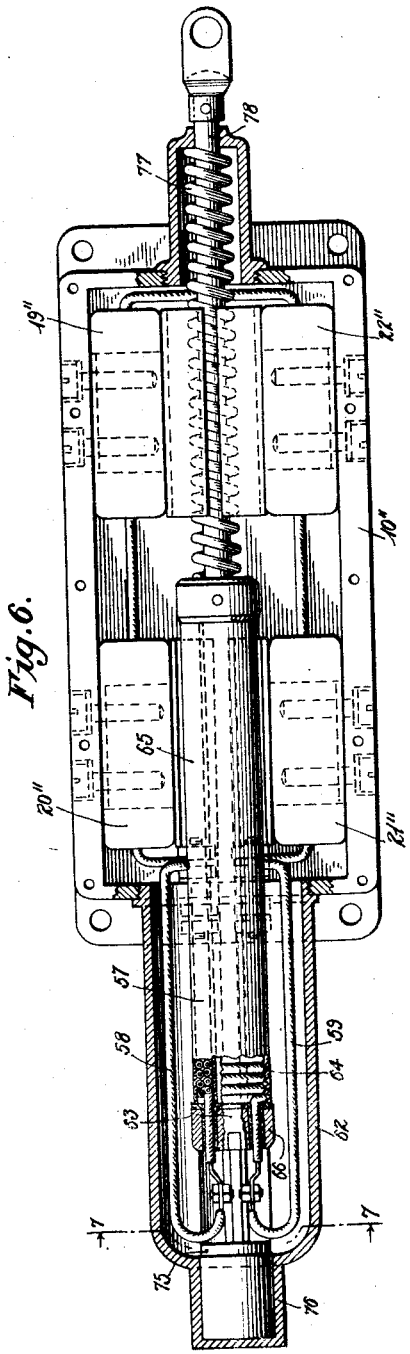
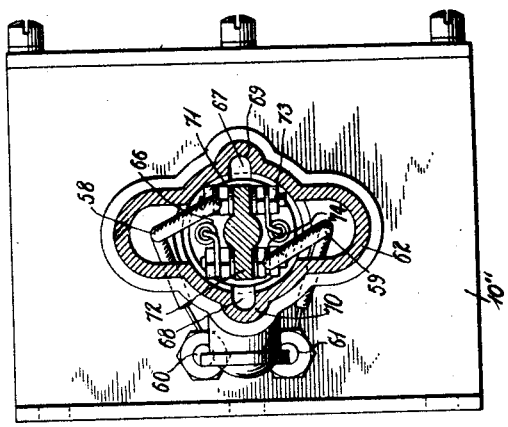
Inventor
Manuel D. Dominguez
By Brown & Phelps
Attorneys Patented June 15, 1926.

1,588,711

UNITED STATES PATENT OFFICE.

MANUEL D. DOMINGUEZ, OF NEW ORLEANS, LOUISIANA.

ELECTROMAGNETICALLY-OPERATED MOTOR.

Application filed May 13, 1925. Serial No. 30,105.

The invention relates to electromagnetically operated motors and has as an object the provision of a motor which may be utilized to actuate the brakes upon a vehicle, the points of a railway switch, or for other analogous service.

A further object of the invention is the provision of electric actuating means for vehicle brakes.

A further object of the invention is the provision of means for actuating an electric brake or for performing other like service which is actuated upon its return to normal position to prevent shock upon the mechanism or vehicle to which the same is applied.

Further objects of the invention will appear from the following description when read in connection with the accompanying drawing showing illustrative embodiments of the invention and wherein Fig. 1 is a side elevation of the motor;

Fig. 2 is a plan view slightly enlarged with the cover removed and partly in section;

Fig. 3. is a vertical transverse section on line 3—3 of Fig. 2;

Fig. 4 is a diagrammatic view of the device applied to brake actuation, showing a diagram of circuits;

Fig. 5 is a view similar to Fig. 2 of a modification upon a similar scale;

Fig. 6 is a like view of a still further modification, and

Fig. 7 is a vertical transverse section on line 7—7 of Fig. 6.

As shown, the device comprises a casing 10 having perforated flanges 11—12, whereby to secure the same to the under side of a vehicle or to any other structure to which the motor is to be applied. An end of the casing is shown as formed with a tubular extension 13 to receive the projection of a tubular core 14. The extension 13 is shown as closed by a cap 15, of non-magnetic material, as brass, serving as an anchor for a rod 16, which in turn carries a disk 17 forming an abutment for a coiled spring 18, adapted to return the core to normal position.

To actuate the core 14 there are shown coils 19, 20, 21, 22, which, as shown, are connected in series by means of the wires 23, 24, 25, 26, 27. The wire 23 is connected to the inner end of a binding post 28 and the wire 27 to the inner end of the binding post 29, which posts present outward connections 30 and 31 for conductors to the source of power.

The coils 19 to 22 inclusive are each retained in place by being mounted upon the cores 32, 33, 34, 35 respectively, which cores are rigidly fixed in position within the casing by means of cap screws 36. The coils are retained in place upon the cores against lateral movement thereon by thin sheets of insulating material 37 which, in turn, are retained by pins 38 fixed in the core pieces. As shown more clearly in Fig. 3, the ends of the core pieces are cut away upon arcs of a circle so as to provide a minimum clearance for the movable core 14.

The core 14 is shown as formed as a cylindrical shell integrally closed at one end and closed at the opposite end by means of a screw plug 39, which screw plug serves as an abutment for an end of the coiled spring 18.

To provide a dash pot to cushion the return of the movable core 14 to normal position, the disk 17 is provided with a close fit in the core 14, and the groove 40 is formed in the wall of the cylinder terminating short of the closed end of the cylinder, a hole 41 being formed in the screw plug 39 for passage of air. In the return of the core 14 to normal position, the air beyond the disk 17 may freely escape until the end of the groove 40 is reached, after which the compression of the air in the end of the cylinder will check the movement of the core.

The rod 16 is formed with a shoulder at 42 bearing against the interior of the screw cap 15 and is rigidly mounted upon the cap by means of the nuts 43, thereby serving as an anchor for the coiled spring 18.

The casing 10 is shown as closed by means of a cover 44, retained in place by cap screws 45.

The power exerted by the core 14 may be applied through the means of a rod 46 secured in the closed end of the core 14 as by pin 47 passing through the end of the casing 10 and provided with a yoke 48 at its end. As shown, the yoke 48 is provided with a pin 49 which may pass through a brake beam 50, Fig. 4, to act upon brake actuating apparatus 51, 52, 53.

In the form of the invention shown in Fig. 5, the spring 18' abuts a portion 54 within the cylindrical core 14', and abuts at the opposite end against the interior of the casing 10', being guided and retained in alignment by means of the rod 46'. In this form of the invention, the cylindrical extension 55 of the casing is shown as screw-threaded into the casing 10' and as closed by means of a screw cap 56. The extension 55 and cap 56 should be formed of non-magnetic material.

The core pieces 32' to 35' inclusive are indicated as formed with shoulders to effectively retain the coils 19' to 22' inclusive. The action of this form of the device is identical with that already described with the exception of the dash pot action of the modification first described.

In the modifications already described, the movable cylindrical core and the core pieces should be formed of magnetic material, as soft iron, while the rods 16 and 46', and the disk 17, should be of non-magnetic material such as brass.

In the form of the invention shown in Figs. 6 and 7, the coils 19'', 20'', 21'', 22'' are shown as arranged in the casing 10'' in the same manner as in the forms already described while the cores 32'' to 35'' inclusive are formed after the manner illustrative in Fig. 5. In this form of the invention the movable core 57 is formed as a solenoid and is connected in parallel with coils 20'' and 21'' by means of wires 58 and 59. Binding posts 60—61 are shown mounted in the end of the casing adjacent the extension 62 thereof for making connection with each of the coils within the casing. The extension 62 should be formed of non-magnetic material.

The movable core 57 is shown as formed with a central rod 63 about which insulating material is wound and upon which insulating material the coil 64 is formed, the whole being then covered with a suitable covering 65. Mounted upon the rod 63 there is a head 66 provided with wings 67—68 projecting into longitudinal grooves 69—70, formed in the extension 62 to guide the movement of the movable core and to prevent revolution of the same, which would have a bad effect upon the connecting wires 58—59.

The rod 63 is shown as projecting beyond the head 66 and as provided with wings 71—72 having mounted thereon the binding posts 73—74 to which are connected the conductors 58—59 and also the ends of the coil 64. Mounted upon the end of the rod 63 is a piston 75 adapted to enter the cylinder 76 to provide a dash pot action for cushioning the return of the movable core to normal position under influence of spring 77.

As before described, the rod 78 through which the power is applied should be formed of non-magnetic material.

Connected as described, the polarity of the individual energized coils is such as to cause the movable core to be drawn forcibly into the field of the fixed coils when the device is energized.

As diagrammatically shown in Fig. 4, the conductors 79—80 may be connected through a switch 81 with any suitable source of power 82 or 83, a rheostat 84 being included in one side of the circuit to graduate the application of the energy to the device by means of a coupling 85. Other devices may be connected in parallel with the one shown as, for instance, the brake mechanism upon other cars of a train.

A limiting resistance 86 is preferably inserted in one side of the circuit adjacent the connection to each individual mechanism.

In the form of the invention shown in Fig. 5, a tapped opening 87 is shown to which a suitable lubricating device may be attached if desired.

Minor changes may be made in the physical embodiment of the invention without departing from the spirit thereof within the scope of the appended claims.

I claim:

1. An electromagnetically operated motor comprising, in combination, a plurality of fixed core pieces having faces in juxtaposition, coils mounted upon and encircling said cores, said faces bearing substantially semi-circular recesses, a movable core normally projecting into the space between certain of said cores and adapted to be drawn into the space between other of said cores upon energization of the coils, means for connecting said movable core to a member to be operated.

2. An electromagnetically operated motor comprising, in combination, a plurality of opposed fixed cores, coils mounted upon and encircling said cores, a cylindrical core adapted to be drawn between said fixed cores when said coils are energized, a spring extending within said movable core resisting the movement thereof and adapted to return the same to normal position, and means to connect said movable core to a member to be operated.

3. An electromagnetically operated motor comprising, in combination, a frame, a plurality of core pieces fixed in said frame in opposed pairs, coils mounted upon and encircling said cores, a movable cylindrical core projecting normally between certain of said fixed cores and adapted to be drawn between others thereof when said coils are energized, a fixed rod projecting into said movable core, a spring anchored to said rod and abutting against a portion of said movable core to return the same to normal position when said coils are deenergized, and means to connect said movable core with a member to be operated.

4. An electromagnetically operated motor comprising, in combination, a frame, cores rigidly mounted in said frame in opposed pairs and having coils mounted thereon, a movable cylindrical core projecting between one pair of said fixed cores and adapted to be drawn between another pair thereof when said coils are energized, a rod anchored to said frame projecting into said core, a disk mounted upon said rod adapted to have a dash pot action with a portion of said cylinder to cushion its return to normal position, a spring mounted on said rod abutting against said disk and against an end of said cylindrical core to return the same to normal position, and means to connect said movable core with a part to be operated.

5. An electromagnetically operated motor comprising, in combination, a frame, fixed core pieces rigidly carried by said frame in opposed pairs, coils mounted upon and encircling said cores, a sheet of insulating material retaining each coil in position, means carried by each core to retain said sheet and coil in position, a movable core mounted to reciprocate between said fixed cores, and means to connect said movable core with a member to be operated.

6. An electromagnetically operated motor comprising, in combination, a casing, cores fixed in said casing in opposed pairs, coils mounted upon said cores, said casing having a cylindrical extension, a cap for said extension, a movable cylindrical core normally housed in said extension and projecting between one pair of said fixed cores, a rod rigidly anchored to said cap and projecting into said movable core, a spring mounted upon said rod and abutting a portion thereof at one end and against the interior of the movable core at its other end, whereby to return the core to normal position, and means to connect said movable core with a part to be operated.

MANUEL D. DOMINGUEZ.